S. S. DIXON.
SHEET FEEDING MEANS FOR ACCOUNTING AND TYPEWRITING MACHINES.
APPLICATION FILED MAR. 27, 1917.
1,348,984.
Patented Aug. 10, 1920.
6 SHEETS—SHEET 2.
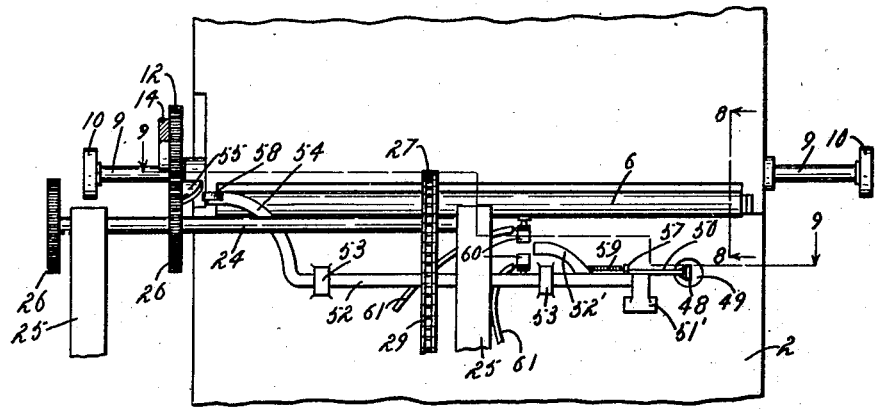
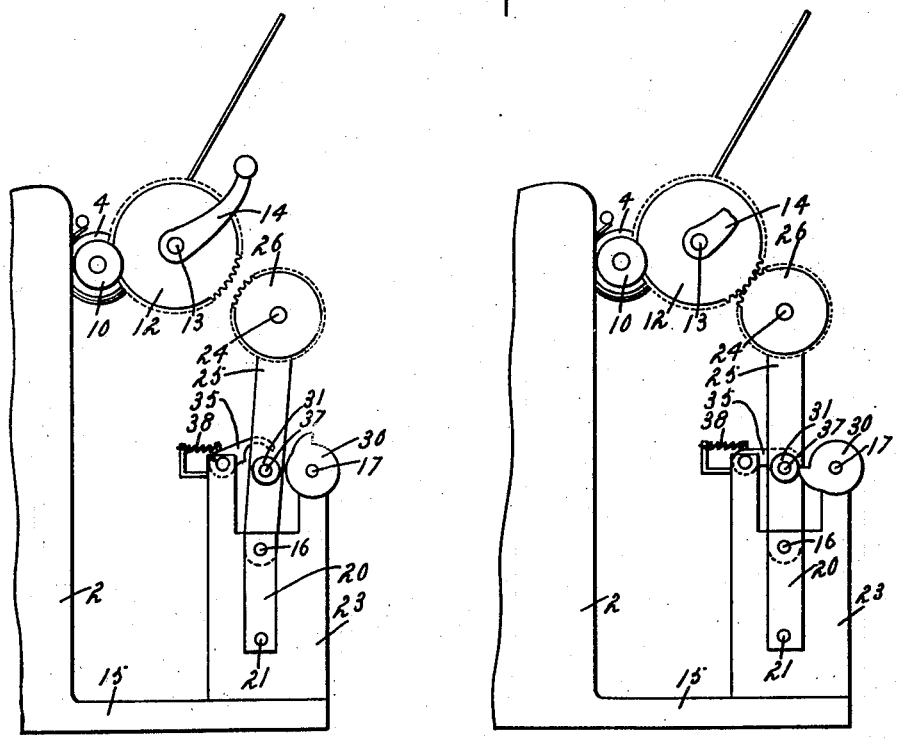
WITNESSES:
INVENTOR.
SAMUEL S. DIXON
BY
ATTORNEYS.

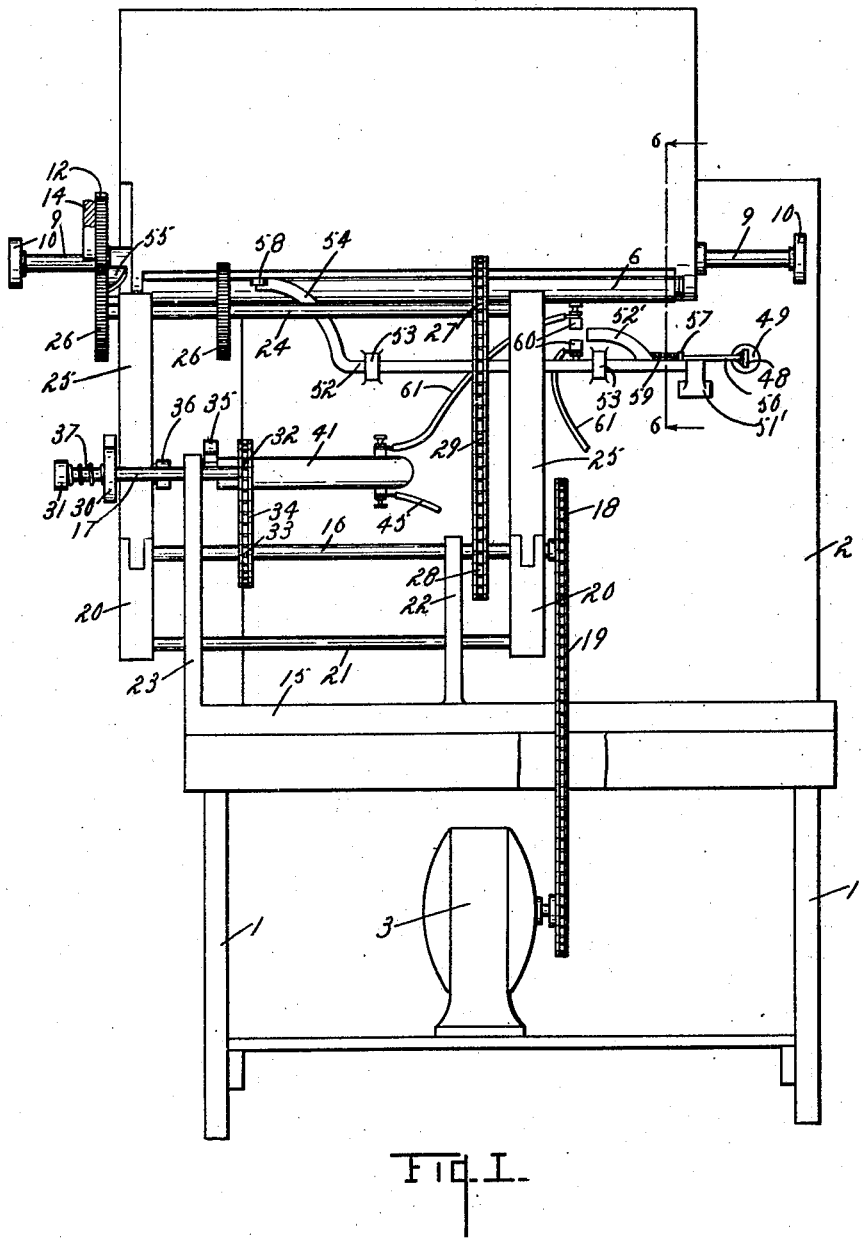
Fig. I.

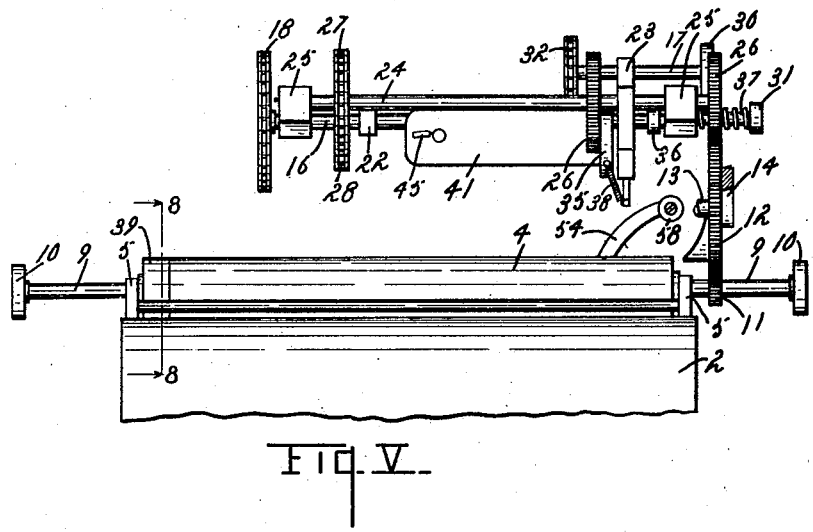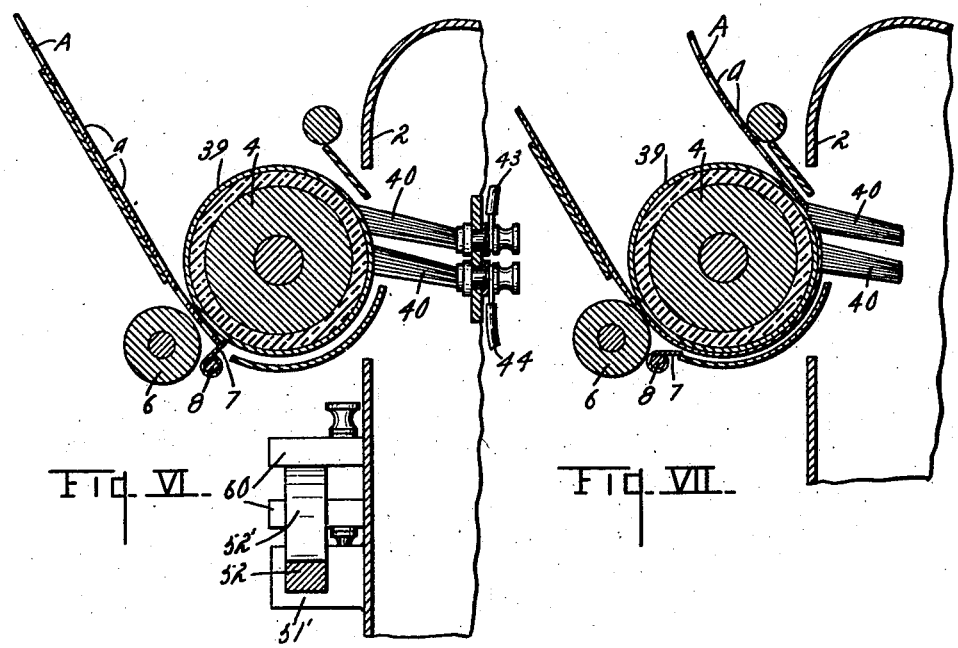

S. S. DIXON.
SHEET FEEDING MEANS FOR ACCOUNTING AND TYPEWRITING MACHINES.
APPLICATION FILED MAR. 27, 1917.
1,348,984.
Patented Aug. 10, 1920.
6 SHEETS—SHEET 4.
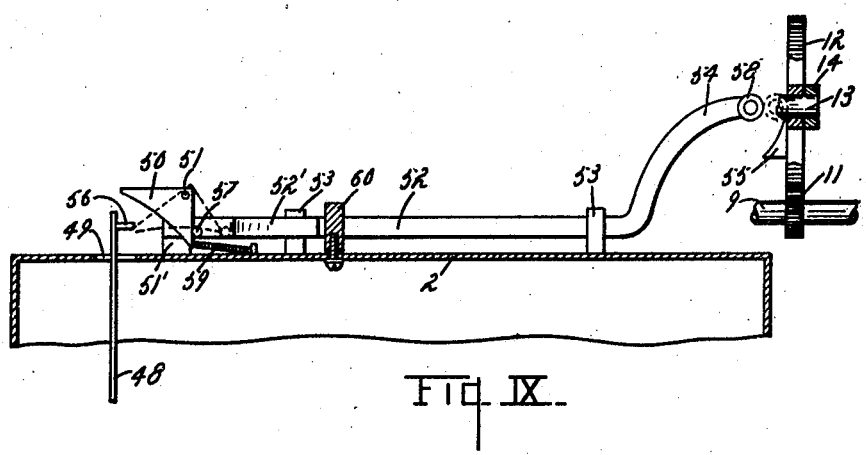
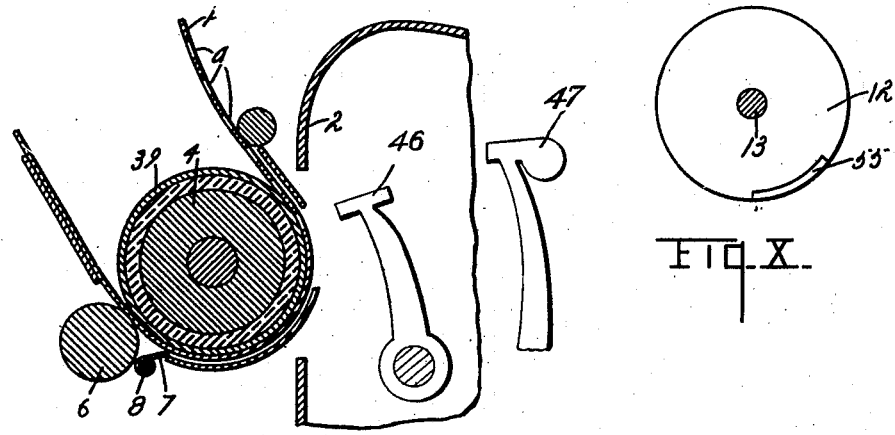
WITNESSES:
INVENTOR.
SAMUEL S. DIXON
BY
ATTORNEYS.

S. S. DIXON.
SHEET FEEDING MEANS FOR ACCOUNTING AND TYPEWRITING MACHINES.
APPLICATION FILED MAR. 27, 1917.
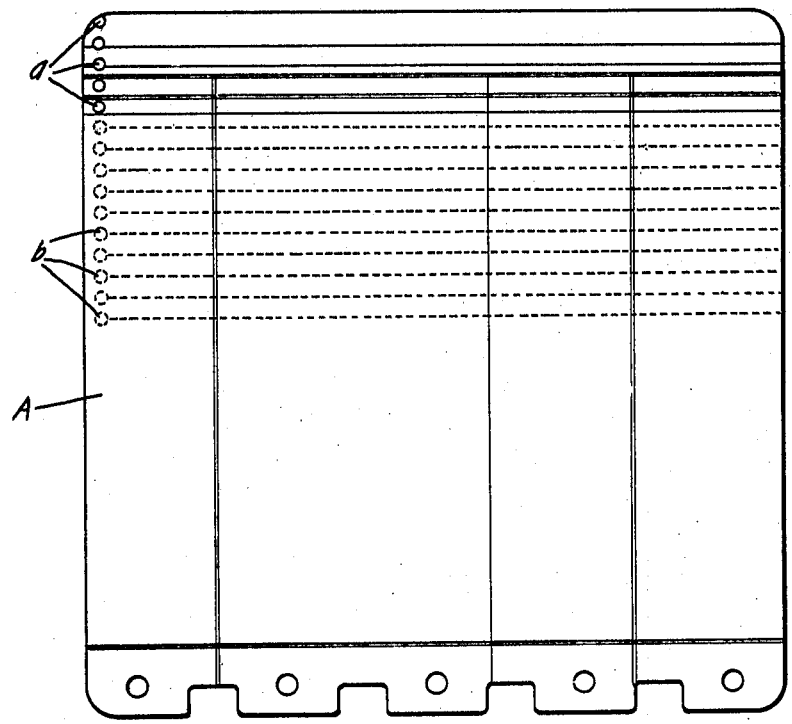
Fig. XI.
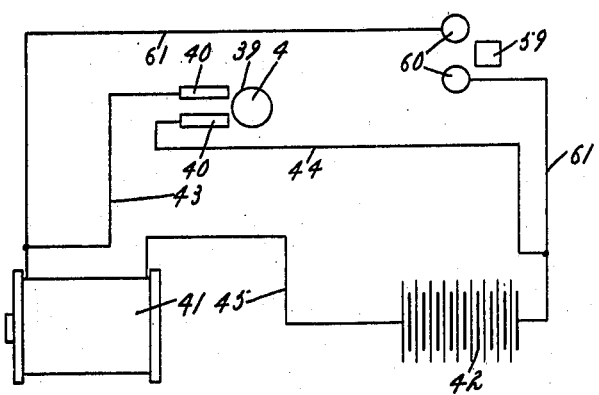
Fig. XII.
WITNESSES:
INVENTOR.
SAMUEL S. DIXON
BY
ATTORNEYS.

S. S. DIXON.
SHEET FEEDING MEANS FOR ACCOUNTING AND TYPEWRITING MACHINES.
APPLICATION FILED MAR. 27, 1917.
1,348,984.
Patented Aug. 10, 1920.
6 SHEETS—SHEET 6.
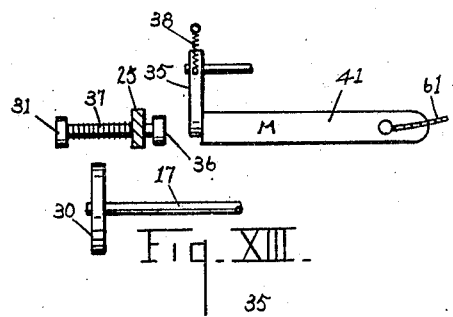
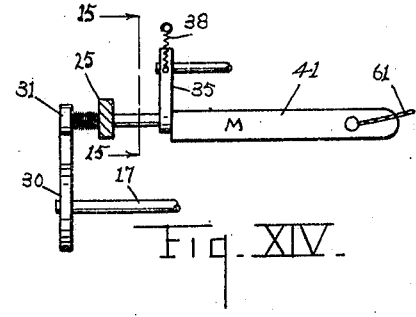
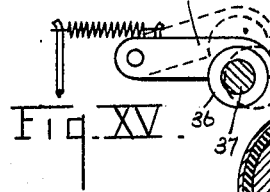
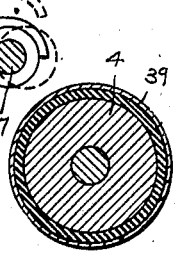
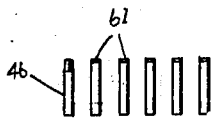
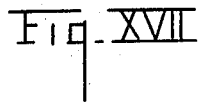
Inventor
SAMUEL S. DIXON

UNITED STATES PATENT OFFICE.

SAMUEL S. DIXON, OF DETROIT, MICHIGAN, ASSIGNOR TO KALAMAZOO LOOSE LEAF BINDER CO., OF KALAMAZOO, MICHIGAN.

SHEET-FEEDING MEANS FOR ACCOUNTING AND TYPEWRITING MACHINES.

1,348,984.     Specification of Letters Patent.     Patented Aug. 10, 1920.

Application filed March 27, 1917. Serial No. 157,818.

*To all whom it may concern:*

Be it known that I, SAMUEL S. DIXON, a citizen of the United States, residing at city of Detroit, county of Wayne, State of Michigan, have invented certain new and useful Improvements for Sheet-Feeding Means for Accounting and Typewriting Machines, of which the following is a specification.

This invention relates to improvements for accounting and typewriting machines.

In machine accounting or record keeping by means of typewriting machines the record sheets, under ordinary circumstances, are repeatedly inserted and removed as it is desired to enter or record succeeding items or transactions from time to time. Ordinarily much time is consumed in properly positioning the sheets so that the succeeding items are properly positioned and the various entries regularly or uniformly spaced, it being a common observation that operators are likely to space items too far apart or too close together, or sometimes superimpose one entry upon another, which causes confusion and, at best, an untidy appearance.

The main objects of this invention are:

First, to provide an improved record sheet for employment in accounting machine or typewriter record keeping which greatly facilitates the entry and positioning of the sheet in the machine and the proper spacing of succeeding entries.

Second, to provide means whereby the record sheet introduced into the machine coacts with parts of the machine to automatically bring the sheets to proper writing position.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this specification, in which:—

Figure I is a rear view of an accounting or record keeping machine embodying the features of my invention, with the carriage at the front end of its stroke.

Fig. II is a detail rear elevation of certain parts shown in Fig. I, with the carriage at the rear end of its stroke.

Fig. III is a detail end elevation looking from the left of Fig. I, showing the platen feed gears disengaged.

Fig. IV is a detail elevation of the same parts showing the platen feed gears engaged.

Fig. V is a detail plan view of the sheet feeding mechanism.

Fig. VI is an enlarged detail vertical section on a line corresponding to line 6—6 of Fig. I, showing further details of the sheet feeding mechanism and of the control therefor.

Fig. VII is a view of the parts shown in Fig. VI, with the sheet advanced to printing position.

Fig. VIII is a detail vertical section on a line corresponding to line 8—8 of Figs. II and V, showing the sheet punching mechanism or the mechanism for punching the feed control apertures of the sheet as the sheet is fed through the machine in making entries thereon.

Fig. IX is an enlarged detail view showing details of the operating mechanism taken on a line corresponding to the broken line 9—9 of Fig. II.

Fig. X is a rear view of one of the feed gears showing structural details thereof.

Fig. XI is a plan view of one of my improved sheets.

Fig. XII is a diagrammatic view showing the electrical connections for the feed control.

Fig. XIII is a detail view of portions of the electrically controlled platen actuating means in inoperative position.

Fig. XIV is a view of the same parts as shown in Fig. XIII in their actuated position.

Fig. XV is a detail section on a line corresponding to line 15—15 of Fig. XIV.

Fig. XVI is a detail view partially in vertical section showing further details of the sheet punching machine.

Fig. XVII is a detail plan view showing the relation of the sheet punching mechanism to the type bars and parts of their mechanism.

In the accompanying drawing I have illustrated my improvements as applied to an accounting machine, which is mainly shown conventionally, the details of the machine forming no part of my present improvements. Mechanism illustrated, however, is particularly designed for embodiment in "Burroughs" machines, but may be readily adapted to other makes of accounting machines and to typewriters.

In the drawing similar reference characters refer to similar parts throughout the several views, and the sectional views are taken looking in the direction of the little arrows at the ends of the section lines.

Referring to the drawing, 1 represents the frame of the machine and 2 the housing or casing in which the printing mechanisms of the machine are arranged. The motor 3 is designed to perform its usual functions of driving the printing mechanism, the driving connections, however, not being here illustrated. The motor 3 is also adapted to drive my improved paper feed mechanism. The platen 4 is mounted on bearings 5 carried by the carriage which may be, and preferably is, provided with the usual operating means, my improvements, as illustrated, being an attachment or addition to the regular mechanism. A feed roll 6 is positioned to coact with the platen and is adapted to be thrown to and from feeding positions, as shown in Figs. VI and VII. The means for accomplishing this are not shown as the usual means may be employed for the purpose.

Below the feed roll 6 I provide a swinging paper stop 7, which is mounted on the rod 8, which is operatively connected to the shifting means for the feed roll, so that when the feed roll is actuated to space it from the platen to receive the paper, as shown in Fig. VI, the stop is swung to erected position, and when the feed roll is swung to engage the paper the stop is collapsed, as shown in Fig. VII, permitting the paper to pass the same.

The spindle 9 of the platen is provided with finger pieces 10 at its ends by means of which the platen may be manually manipulated, if desired. The spindle 9 is provided with a pinion 11 meshing with a gear 12 carried by the shaft 13 at the rear of the platen.

The shaft 13 is commonly provided with a lever 14 by means of which it may be actuated to actuate the gear 12.

These parts described, with the exception of the stop 7, are commonly found in "Burroughs" machines of the type in which I have illustrated my improvements.

At the rear of the housing 2 I mount a bracket 15 supporting the shafts 16 and 17 and other parts,—see Figs. I, III and IV. The shaft 16 is provided with a gear 18 connected to the motor 3 by the sprocket chain 19. The shaft 16 is supported at its ends by the bearing members 20, mounted on the ends of a rod 21 disposed through the uprights 22 and 23, of the bracket 15.

A shaft 24 provided with a pair of gears 26 is mounted on the swinging arms 25, which are pivoted on the shaft 16, so that one or the other of the gears 26, the particular one depending on the position of the carriage, may be swung into and out of mesh with the gear 12,—see particularly Figs. I, III and IV. The shaft 24 is connected to the shaft 16 by means of sprockets 27 and 28, respectively, and the sprocket chain 29. When the shaft 24 is swung to one position, as shown in Fig. IV, one of the gears 26 and the gear 12 are brought into mesh to drive the platen, the driving connections being broken when the shaft 24 is swung to another position, as shown in Fig. III. The swinging supports for the shaft are actuated by the cam 30 mounted on the shaft 17 to coact with the roller 31, when it is shifted to position to coact therewith as will be made clear as the description proceeds.

The shaft 17 is connected with the shaft 16 through the sprockets 32 and 33 and the sprocket chain 34.

A latch 35 is mounted on the upright 23 of the bracket to engage a keeper 36 on the armature 37, holding one or the other of the gears 26 in engagement with the gear 12. The armature 37 also carries the roller 31. The latch is held normally in its disengaged position by means of the spring 38 and is actuated to its engaging position by the magnet 41,—see Figs. III, IV, XIII, XIV and XV.

I will now describe the insertion of the sheet and the means whereby it is automatically fed to writing position. The sheet A,—see Fig. XI, is provided with a series of perforations $a$ adjacent its left hand edge. In inserting the sheet the feed roll 6 is thrown back which, as before explained, swings the stop 7 to position. The sheet is dropped behind the roller and against the stop, which properly squares it up and positions it to coact with the feed mechanism. The feed roll 6 is then released, which grips the sheet and drops the stop 7.

The platen is provided with an annular contact ring 39 with which the brushes 40 coact to complete the circuit. These brushes are connected to the magnet 41 which controls the armature 37 and also, as stated, the latch 35. When the current is on the magnet the armature is actuated, which carries the roller 31 into position so that it is engaged by the cam 30, which rocks the supports, and the pinion 26 is thereby brought into mesh with one of the gears 12, which, through its connection with the platen feeds the paper into the machine. When the paper passes under the brushes 40 the contact of the brushes with the ring 39 is made through the apertures $a$ and the feeding continues until the lower brush 40 passes upon the unperforated portion of the sheet, which breaks the contact releasing the magnet and breaking the driving connections.

In Fig. XII I illustrate the electrical supply as a battery 42, although, in practice it might be connected with the same source of power as the motor. The connections, as shown, consist of the wire 43 leading from one of the brushes 40 to the magnet 41, the wire 44 leading to the battery, and the wire 45 connecting the battery to the magnet.

I provide means for forming the perforations b of the sheet A as the entries upon the sheet progress, the machine being provided with a perforator or punch 46,—see Fig. VIII, actuated by a hammer 47, suitably connected to the mechanism of the machine so that the perforations are formed at the completion of the entries in a particular space, so that there always is a perforation opposite the last entry, as indicated in Fig. XI. The punch 46 is disposed at the end of the series of type bars 61, which are shown conventionally in Fig. XVII. In practice, key actuated means are provided for setting these type bars to be actuated simultaneously by the hammers 62, that is, the type bars which have been set are simultaneously actuated. This mechanism is not necessarily modified or changed in any manner except by the addition of the punch 46 and an additional hammer 47. The hammers are pivoted on a rod 63 and provided with actuating springs 64 connected to a frame piece 65. The punch 46 is carried by a pivot 66. The type bars 61 are mounted in their usual manner, as stated, the mounting not being illustrated. After actuation by the spring 64 the hammers are returned by the rod 67 which is operatively connected to the actuating lever 68. The operating connections for this rod to the actuating lever are not illustrated as they are the usual connections. The hammers are retained in their initial or return position by means of the catches 69 mounted on a rock shaft 70 having an arm 71 at one end slotted at 72 to be engaged by a pin 73 of the crank 74 on the shaft 75 on which the actuating lever 68 is mounted.

With the parts thus arranged, whenever the lever 68 is actuated to release the hammers and actuate the type after the same has been set in the usual manner the punch hammer is released at the same time actuating the punch and making the perforation as described. The hammers are returned against a stop 76 by the actuating lever.

When a particular transaction or entry is completed the record sheet is automatically ejected by pressing the totaling key, which is provided with an extension or actuating member 48 mounted to reciprocate through a hole 49 in the rear of the housing and engage the actuating lever 50, which is pivoted at 51 on the control bar 52. This control bar 52 is mounted to reciprocate in suitable slide bearings 53 and is offset at 54 to coact with the cam 55 on the inner or rear side of the gear 12,—see Figs. IX and X.

On the forward movement of the control bar 48 the lever 50 yields on its pivot, it being supported by the coiled spring 59 to allow the detent 56 to pass, but on the return movement of the member 48 it engages the lever 50 swinging it against the stop pin 57 and shifting the bar 52 to bring its roller 58 into position to be engaged by the cam 55. The shifting of the control bar 52 also brings the contact 52' mounted thereon into engagement with the pair of contacts 60, which are connected as shown in Figs. I, II and III.

The contacts 60 are connected through the wires 61 to the magnet 41 and the battery 42, as shown diagrammatically in Fig. XII. When this connection is formed through the contacts 59 and 60 the armature is actuated, which brings the gears 12 and 26 into mesh through the mechanisms described, and the platen is rotated to eject the sheet.

Owing to the proportion of the gears 12 and the pinions 11 a complete revolution of the gear 12 will more than suffice to eject a sheet before the platen is stopped. The cam 55 engages the roller 58, shifting the control bar 52 to its initial position, and thus disengages the contacts releasing the magnets and thereby stopping the feed mechanism.

I have described a complete operation in the insertion and removal of a sheet in describing the mechanism and it is believed that it is unnecessary to repeat the operations.

My improvements greatly facilitate machine accounting and the keeping of accounting records on typewriting and like machines in that sheets may be inserted very quickly and are automatically advanced to printing position without the necessity for care on the part of the operator in adjusting or manipulating the same, and further, the sheets are ejected from the machine when the work is completed.

I have illustrated one embodiment or adaptation of my improvements to a type of machine known commercially as the "Burroughs." My improvements are, however, capable of embodiment or adaptation in other types of machines, as stated, but I have not deemed it necessary to illustrate such variations or adaptations as my present application is directed generally to the sheet adapted for use in this relation as a control member and as an element with the intermediate coacting mechanism.

I employ the term sheet in its broad sense as comprehending cards and the like adapted as records.

Having thus described my invention, what

I claim as new and desire to secure by Letters Patent, is:

1. In a structure of the class described, the combination with a platen, of a platen actuating means comprising an annular contact on said platen and a pair of coacting brushes, said platen being adapted to receive a sheet having a longitudinally disposed series of perforations positioned to overlie said contact on said platen and through which said brushes may make contact therewith, and means for forming additional perforations in the series as the making of the entries on the sheet progresses, all coacting for the purpose specified.

2. In a structure of the class described, the combination with a platen, of a platen actuating means comprising an annular contact on said platen and a pair of coacting brushes, said platen being adapted to receive a sheet having a longitudinally disposed series of perforations positioned to overlie said contact on said platen and through which said brushes may make contact therewith, all coacting for the purpose specified.

3. In a structure of the class described, the combination with sheet feeding means adapted to coact with a record sheet provided with a longitudinal series of uniformly spaced holes coacting with said sheet feeding means to control the operations thereof, there being an imperforate portion of said sheet alined with said series of holes, and means for adding to the series of holes as the sheet is advanced in making the record.

4. In a structure of the class described, the combination with a platen, and a platen actuating means comprising a contact member on said platen and a pair of coacting brushes, said platen being adapted to receive a sheet provided with holes through which said brushes may make contact with the contact of the platen.

5. In a structure of the class described, the combination of an electrically controlled sheet feeding means comprising an electrical contact, and adapted to receive a record sheet provided with holes through which said contact acts to make the electrical connections for controlling the sheet feeding means, and means for forming additional holes as the sheet advances.

6. The combination of a record sheet having longitudinally disposed holes spaced uniformly to correspond with the printing spaces of the sheet and extending across the heading thereof, the last hole being one space in advance of the first printing space of the sheet, and a machine for making a record on said sheet provided with a sheet feeding means comprising a member acting through said holes, said machine being provided with means for forming additional holes in the sheet as the making of the record progresses.

7. The combination of a record sheet having longitudinally disposed holes spaced uniformly to correspond with the printing spaces of the sheet and extending across the heading thereof, the last hole being one space in advance of the first printing space of the sheet, and a machine for making a record on said sheet provided with a sheet feeding means comprising a member acting through said holes to control the feeding of the sheet.

8. The combination with a sheet, of a machine for making a record on said sheet provided with a sheet feeding means comprising a platen having a contact member thereon and a pair of coacting brushes, said sheet being provided with a series of perforations spaced to correspond to the printing spaces of the sheet and controlling said contact brushes, the sheet having an imperforate portion alined with said series of perforations, and means for forming additional perforations in said sheet as the making of the record thereon progresses.

9. The combination with a sheet, of a machine for making a record on said sheet provided with a sheet feeding means comprising a platen having a contact member thereon and a pair of coacting brushes, said sheet being provided with a series of perforations spaced to correspond to the printing spaces of the sheet and controlling said contact brushes, and means for forming additional perforations in said sheet as the making of the record thereon progresses.

10. The combination of a sheet, and a machine for making a record on said sheet provided with an electrically controlled sheet feeding means comprising contact members, said sheet being provided with a series of perforations controlling said contact members, the sheet having an imperforate portion alined with said series of perforations, said machine being provided with means for forming additional perforations in said sheet as the making of the record thereon progresses.

11. The combination of a record sheet having longitudinally disposed holes spaced uniformly to correspond with the printing spaces of the sheet and extending across the heading thereof, the last hole being one space in advance of the first printing space of the sheet, and a machine for making a record on said sheet provided with an electrically controlled sheet feeding means comprising contact members coacting through said holes, said machine being provided with means for forming additional holes in the sheet as the making of the record progresses.

12. The combination of a record sheet having longitudinally disposed holes spaced uniformly to correspond with the printing spaces of the sheet and extending across the heading thereof, the last hole being one space in advance of the first printing space of the sheet, and a machine for making a record on said sheet provided with an electrically controlled sheet feeding means comprising contact members coacting through said holes.

13. In a structure of the class described, the combination of a sheet feeding means, a record sheet provided with holes through which said sheet feeding means acts to control feeding of the sheet and means for forming additional holes as the sheet advances.

In witness whereof I have hereunto set my hand and seal in the presence of two witnesses.

SAMUEL S. DIXON. [L. S.]

Witnesses:
 ANNETTE MARKHAM,
 GEO. P. WIGGINTON.